(12) United States Patent
Zhang et al.

(10) Patent No.: US 8,749,586 B2
(45) Date of Patent: Jun. 10, 2014

(54) METHOD AND APPARATUS FOR PROVIDING FOLDER ITEM INFORMATION BASED ON TOUCH OPERATION

(75) Inventors: Jie Zhang, Nanjing (CN); Chen Chen, Nanjing (CN); Jingsong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 13/552,288

(22) Filed: Jul. 18, 2012

(65) Prior Publication Data

US 2013/0021381 A1   Jan. 24, 2013

Related U.S. Application Data

(63) Continuation of application No. PCT/CN2012/073538, filed on Apr. 5, 2012.

(30) Foreign Application Priority Data

Jul. 21, 2011   (CN) .......................... 2011 1 0205058

(51) Int. Cl.
   *G09G 5/00*   (2006.01)
(52) U.S. Cl.
   USPC .......................................................... 345/660
(58) Field of Classification Search
   None
   See application file for complete search history.

(56) References Cited

U.S. PATENT DOCUMENTS

| 6,181,838 B1* | 1/2001 | Knowlton ...................... 382/305 |
| 6,983,424 B1* | 1/2006 | Dutta ............................ 715/800 |
| 2008/0168384 A1 | 7/2008 | Platzer |
| 2009/0125835 A1 | 5/2009 | Vaughan et al. |
| 2009/0289914 A1 | 11/2009 | Cho |
| 2010/0107099 A1* | 4/2010 | Frazier et al. ................. 715/765 |
| 2010/0251170 A1 | 9/2010 | Louch et al. |
| 2011/0074824 A1* | 3/2011 | Srinivasan et al. ............ 345/660 |

FOREIGN PATENT DOCUMENTS

CN    101578578    11/2009

OTHER PUBLICATIONS

International Search Report and the Written Opinion Of The International Searching Authority mailed Jul. 21, 2011 issued in corresponding International Patent Application No. PCT/CN2012/073538.

* cited by examiner

*Primary Examiner* — Ryan R Yang
(74) *Attorney, Agent, or Firm* — Staas & Halsey LLP

(57) ABSTRACT

Embodiments of the present invention disclose a method and an apparatus for providing folder project information based on a touch operation. The method includes: determining positions of touch points on a display screen; calculating, according to the positions of the touch points, a size of a zoomed display area of a folder item; acquiring a data source that is of the folder item and needs to be displayed, where the data source of the folder item corresponds to the size of the zoomed display area; and displaying the folder item according to an acquired data source and the size of the zoomed display area. According to the embodiments, the level of detail of folder item information in the window may be quickly changed without the need of page switching, thereby improving user experience with simple and quick operation.

4 Claims, 10 Drawing Sheets

METHOD AND APPARATUS FOR PROVIDING FOLDER ITEM INFORMATION BASED ON TOUCH OPERATION

CROSS-REFERENCE TO RELATED APPLICATIONS

This application is a continuation of International Application No. PCT/CN2012/073538, filed on Apr. 5, 2012, which claims priority to Chinese Patent Application No. 201110205058.6, filed on Jul. 21, 2011, both of which are hereby incorporated by reference in their entireties.

FIELD OF THE INVENTION

The present invention relates to the touch interaction technologies, and in particular, to a method and an apparatus for providing folder item information based on a touch operation.

BACKGROUND OF THE INVENTION

At present, some touch terminals may provide users with a method for changing the level of detail of folder item information in a window through a touch operation.

For example, an Android system platform provides a framework of small application tools (AppWidget), which allows a developer to develop application programs of small tools (Widget). A user may drag these Widget applications to a desktop and use the Widget applications to perform interaction. A Widget may provide a preview attribute of a full-featured application program (full-featured apps), for example, may display an upcoming calendar event or detail information of a certain song played by the background. When a Widget application is dragged onto the desktop, a specified space is distributed to the Widget application for displaying self-defined content provided by the application. A user may perform interaction through the Widget, for example, switch photos in a touch manner of up-down sliding.

However, in this technology, a folder item in a current window can only be switched through a touch operation of sliding. If the level of detail of folder item information needs to be changed, page switching needs to be performed. For example, if detail information of a certain folder item needs to be displayed, the user needs to switch to a second-level detail page. In addition, if the levels of detail of information about multiple folder items in the window need to be changed in turn, the user needs to frequently and repeatedly perform a page switching operation, which results in bad user experience.

SUMMARY OF THE INVENTION

A technical issue to be solved in embodiments of the present invention is to provide a method for quickly changing the level of detail of folder item information in a window without the need of page switching and provide a method and an apparatus for providing folder item information based on a touch operation. In this manner, the level of detail of the folder item information in the window may be quickly changed without the need of page switching.

To solve the technical issue, in one aspect, the present invention provides a method for providing folder item information based on a touch operation, where the method includes: when an input event of touch zooming interaction occurs on a display screen, the method includes the following steps: determining positions of touch points on the display screen; calculating, according to the positions of the touch points, a size of a zoomed display area of a folder item where the input event of touch zooming interaction occurs; acquiring a data source that is of the folder item and needs to be displayed, where the data source of the folder item corresponds to the size of the zoomed display area; and displaying the folder item according to an acquired data source and the size of the zoomed display area.

Alternatively, the method further includes: presetting correspondence between the size of the display area of the folder item and the data source of data that needs to be displayed; or presetting correspondence between the size of the display area of the folder item and a layout definition file and correspondence between the data source of data that needs to be displayed and a layout definition file; where the acquiring a data source that is of the folder item and needs to be displayed, where the data source of the folder item corresponds to the size of the zoomed display area specifically is: acquiring the data source that is of the folder item and needs to be displayed, and the layout definition file, where the data source of the folder item and the layout definition file correspond to the size of the zoomed display area; and the displaying the folder item according to an acquired data source and the size of the zoomed display area specifically is: displaying the folder item according to the acquired data source and layout definition file and the size of the zoomed display area.

Alternatively, before the calculating, according to the positions of the touch points, the size of a zoomed display area of a folder item where the input event of touch zooming interaction occurs, the method further includes: determining that the touch points fall on a same folder item. Alternatively, the determining that the touch points fall on a same folder item includes: calculating item numbers that respectively correspond to position coordinates of the touch points; and determining, according to the item numbers, that the touch points fall on the same folder item.

In an embodiment, the determining that the touch points fall on a same folder item includes: calculating item numbers that respectively correspond to position coordinates of the touch points; and determining, according to the item numbers, that the touch points fall on the same folder item.

Alternatively, in any one of the preceding methods, the calculating, according to the positions of the touch points, a size of a zoomed display area of a folder item where the input event of touch zooming interaction occurs includes: calculating, according to a determined distance between position coordinates of the touch points after the input event of touch zooming interaction occurs and a determined distance between initial position coordinates of the touch points before the input event of touch zooming interaction occurs, a ratio between the two determined distances; and calculating, according to the ratio, the size of the display area of the folder item after the input event of touch zooming interaction occurs.

In another aspect, the present invention provides a method for providing folder item information based on a touch operation, where the method includes: when an input event of touch zooming interaction occurs on a display screen, the method includes the following steps: determining the number of touch points or positions of touch points on the display screen; when it is determined that the number of touch points is greater than two or the touch points do not fall on a same folder item, determining a changed display status type of all folder items in a window; acquiring corresponding data sources and layout definition files according to the changed display status type; and displaying the folder items according to acquired data sources and layout definition files.

Alternatively, the method further includes: presetting display status types of folder items and a data source and a layout definition file that correspond to a folder item in each of the display status types of folder items.

Alternatively, the determining a changed display status type of all folder items in a window specifically includes: determining the changed display status type of all folder items in the window according to a ratio or a difference between a determined distance between position coordinates of the touch points after the input event of touch zooming interaction occurs and a determined distance between initial position coordinates of the touch points before the input event of touch zooming interaction occurs.

Accordingly, in another aspect, the present invention further provides an apparatus for providing folder item information based on a touch operation, where the apparatus includes: a touch point detecting module, configured to determine positions of touch points on a display screen when an input event of touch zooming interaction occurs; a calculating module, configured to calculate, according to the positions of the touch points, a size of a zoomed display area of a folder item where the input event of touch zooming interaction occurs; a data acquiring module, configured to acquire a data source that is of the folder item and needs to be displayed, where the data source of the folder item corresponds to the size of the zoomed display area; and a loading module, configured to display the folder item according to the data source acquired by the data acquiring module and the size of the zoomed display area.

Alternatively, the apparatus further includes: a configuring module, configured to preset correspondence between the size of the display area of the folder item and a data source of data that needs to be displayed, or, configured to preset correspondence between the size of the display area of the folder item and a layout definition file and correspondence between the data source of data that needs to be displayed and a layout definition file; where the data acquiring module is specifically configured to acquire the data source that is of the folder item and needs to be displayed, and a layout definition file, where the data source of the folder item and the layout definition file correspond to the size of the zoomed display area; and the loading module is configured to display the folder item according to the acquired data source and layout definition file and the size of the zoomed display area.

Alternatively, the touch point detecting module is further configured to determine that the touch points fall on a same folder item.

In an embodiment, the determining whether the touch points fall on a same folder item includes: calculating item numbers that respectively correspond to position coordinates of the touch points; and determining, according to the item numbers, that the touch points fall on the same folder item.

Alternatively, in an embodiment, the calculating module is specifically configured to, according to a determined distance between position coordinates of the touch points after the input event of touch zooming interaction occurs and a determined distance between initial position coordinates of the touch points before the input event of touch zooming interaction occurs, calculate a ratio between the two determined distances, and calculate, according to the ratio, the size of the display area of the folder item after the input event of touch zooming interaction occurs.

In another aspect, the present invention further provides an apparatus for providing folder item information based on a touch operation, where the apparatus includes: a touch point detecting module, configured to determine the number of touch points or positions of touch points on a display screen when an input event of touch zooming interaction occurs; a determining module, configured to, when it is determined that the number of touch points is greater than two or the touch points do not fall on a same folder item, determine a changed display status type of all folder items in a window; a data acquiring module, configured to acquire corresponding data sources and layout definition files according to the changed display status type; and a loading module, configured to display the folder items according to the data sources and the layout definition files, where the data sources and the layout definition files are acquired by the data acquiring module.

Alternatively, the apparatus further includes: a configuring module, configured to preset display status types of folder items, and set a data source and a layout definition file that correspond to a folder item in each display mode.

Alternatively, the determining module is further configured to determine the changed display status type of all folder items in the window according to a ratio or a difference between a determined distance between position coordinates of the touch points after the input event of touch zooming interaction occurs and a determined distance between initial position coordinates of the touch points before the input event of touch zooming interaction occurs.

Implementation of the embodiments of the present invention brings the following beneficial effects:

The size of the zoomed display area of the folder item where the input event of touch zooming interaction occurs may be calculated according to the positions of the touch points on the display screen, and the folder item is displayed according to the size of the display area and the data source corresponding to the size of the display area. The display status type of all folder items in the window may also be changed according to the number of touch points or the positions of the touch points on the display screen. In this manner, the level of detail of folder item information in the window may be quickly changed without the need of page switching, thereby improving user experience with simple and quick operation.

BRIEF DESCRIPTION OF THE DRAWINGS

To illustrate the technical solutions in the embodiments of the present invention or in the prior art more clearly, accompanying drawings for describing the embodiments or the prior art are briefly introduced in the following. Apparently, the accompanying drawings in the following description illustrate only some embodiments of the present invention, and persons of ordinary skill in the art may further derive other accompanying drawings according to these accompanying drawings without making creative efforts.

DETAILED DESCRIPTION OF THE EMBODIMENTS

The technical solutions in the embodiments of the present invention are clearly and completely described below with reference to the accompanying drawings in the embodiments of the present invention. Apparently, the embodiments to be described are merely part of rather than all of the embodiments of the present invention. All other embodiments obtained by persons of ordinary skill in the art based on the embodiments of the present invention without making creative efforts shall fall within the protection scope of the present invention.

An embodiment of the present invention provides a method for changing the level of detail of folder item information in a window through a touch operation.

Figure 1:
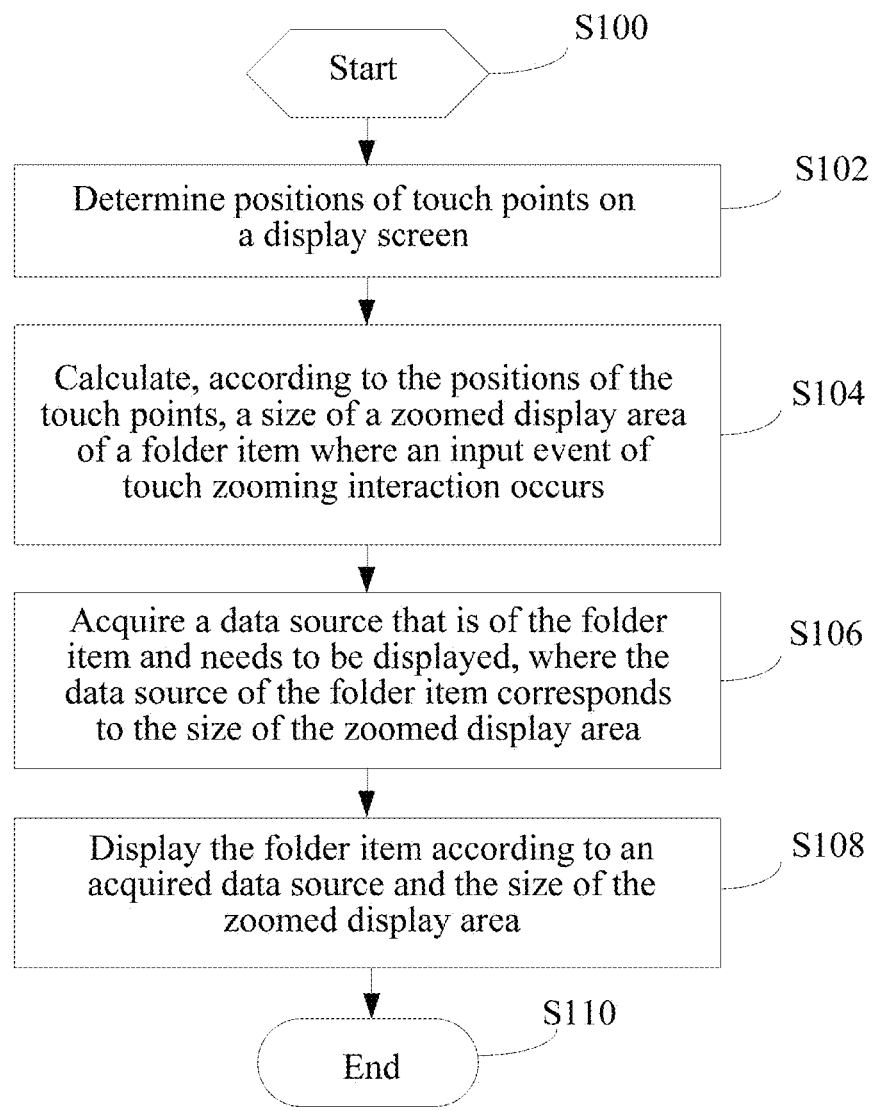
FIG. 1 is a flow chart of a first embodiment of a method for providing folder item information based on a touch operation according to the present invention.

FIG. 1 is a flow chart of a first embodiment of a method for providing folder item information based on a touch operation according to the present invention. The method includes:

Step S100: When an input event of touch zooming interaction occurs on a display screen, the process of this method starts.

Step S102: Determine positions of touch points on the display screen.

In an embodiment, the positions of the touch points may be determined according to position coordinates of the touch points on the display screen.

Step S104: Calculate, according to the positions of the touch points, the size of a zoomed display area of a folder item where the input event of touch zooming interaction occurs.

In an embodiment, according to a determined distance between position coordinates of the touch points after the input event of touch zooming interaction occurs and a determined distance between initial position coordinates of the touch points before the input event of touch zooming interaction occurs, a ratio between the two (namely, the determined distance between the position coordinates of the touch points after the input event of touch zooming interaction occurs and the determined distance between the initial position coordinates of the touch points before the input event of touch zooming interaction occurs) may be calculated, and the size of the display area of the folder item after the input event of touch zooming interaction occurs is calculated according to the ratio. In an embodiment, position coordinates of two touch points when the input event of touch zooming interaction occurs may be used as the initial position coordinates of the two touch points. An initial distance between the two touch points is calculated according to the two initial position coordinates, and is recorded as D0. After the input event of touch zooming interaction occurs, the position coordinates of the two touch points are changed, and a distance between current two touch points is calculated according to the changed position coordinates, and is recorded as D1. In this case, a zooming ratio of the input event of touch zooming interaction is a ratio of D1 to D0, that is, D1/D0. Specifically, the size of the display area of the folder item after an input operation of touch zooming interaction is performed should be D1/D0 times the size of a display area of the folder item before the input operation of zooming interaction is performed.

Step S106: Acquire a data source that is of the folder item and needs to be displayed, where the data source of the folder item corresponds to the size of the zoomed display area.

It should be noted that, generally, the larger the display area, the greater the amount of information of a data source corresponding to the display area, and the higher the level of detail of displayed folder item information.

In an embodiment, correspondence between the size of a display area of a folder item and a data source of data that needs to be displayed may be preset.

In an embodiment, correspondence between the size of a display area of a folder item and a layout definition file and correspondence between a data source of data that needs to be displayed and a layout definition file may also be preset. In this case, step S106 may be: acquiring a data source that is of the folder item and needs to be displayed, and a layout definition file, where the data source of the folder item and the layout definition file correspond to the size of the zoomed display area.

Step S108: Display the folder item according to an acquired data source and the size of the zoomed display area.

Accordingly, if in step 106, the layout definition file corresponding to the size of the zoomed display area is also acquired, step 108 may be: displaying the folder item according to the acquired data source and layout definition file and the size of the zoomed display area.

Figure 9:
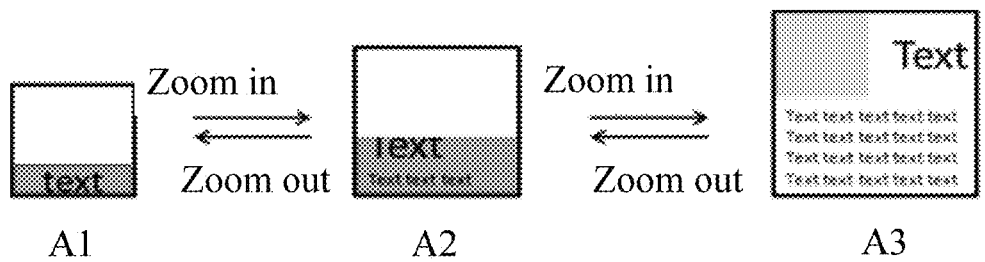
FIG. 9 is a schematic diagram of changing the level of detail of information about a single folder item in a window according to the present invention.
Figure 10:
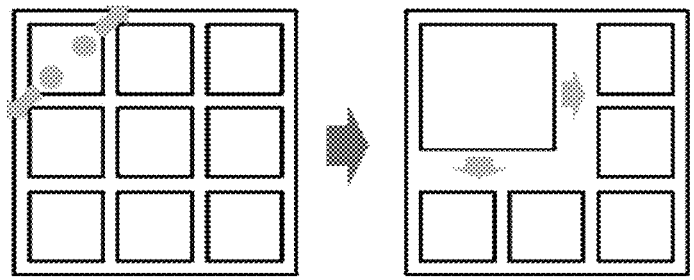
FIG. 10 is a diagram of an effect of performing zooming on a single folder item in a window according to the present invention.

FIG. 9 is a schematic diagram of changing the level of detail of information about a single folder item in a window according to the present invention. It should be noted that, when the size of a display area of a folder item in the window is changed, a visual effect that occurs when the size of the display area of the folder item is changed may be selected as required. For example, when the folder item is zoomed in, the folder item may be superposed on other folder items in the window (as shown in FIG. 10), and may also squeeze out other folder items in the window.

Step S110: The process ends.

The beneficial effects of this embodiment are as follows:

A method for providing folder item information based on a touch operation is provided, so that the size of the zoomed display area of the folder item where the input event of touch zooming interaction occurs may be calculated according to the positions of the touch points on the display screen, and the folder item is displayed according to the size of the display area and the data source corresponding to the size of the display area. In this manner, the level of detail of folder item information in the window may be quickly changed without the need of page switching, thereby improving user experience with simple and quick operation.

Figure 2:
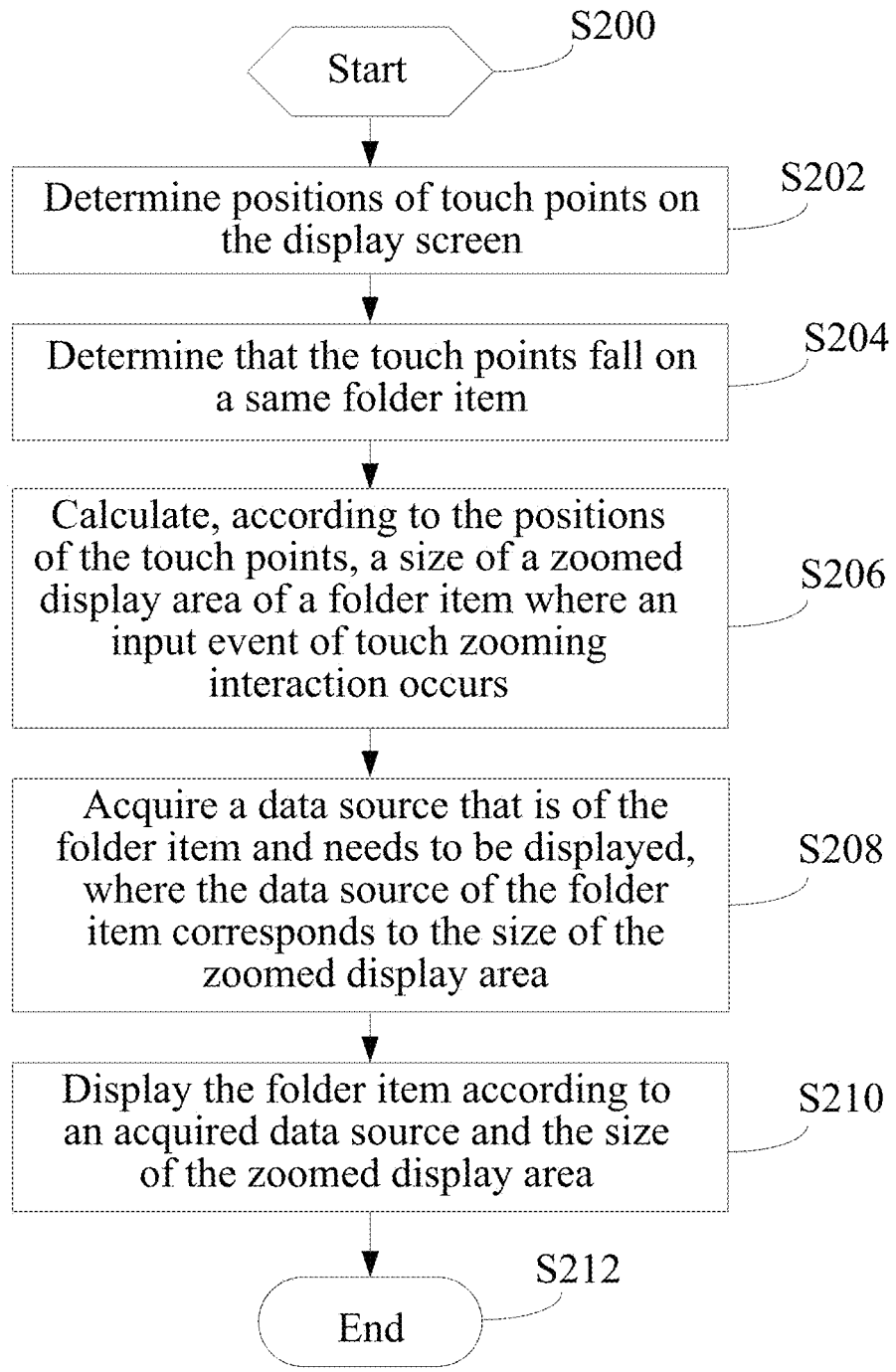
FIG. 2 is a flow chart of a second embodiment of a method for providing folder item information based on a touch operation according to the present invention.

FIG. 2 is a flow chart of a second embodiment of a method for providing folder item information based on a touch operation according to the present invention. The method includes:

Step S200: When an input event of touch zooming interaction occurs on a display screen, the process of this method starts.

Step S202: Determine positions of touch points on the display screen. Step S202 is similar to step S102 in the embodiment illustrated in FIG. 1. For details, reference may be made to the preceding description. No further description is provided here.

Step S204: Determine that the touch points fall on a same folder item.

Figure 3:
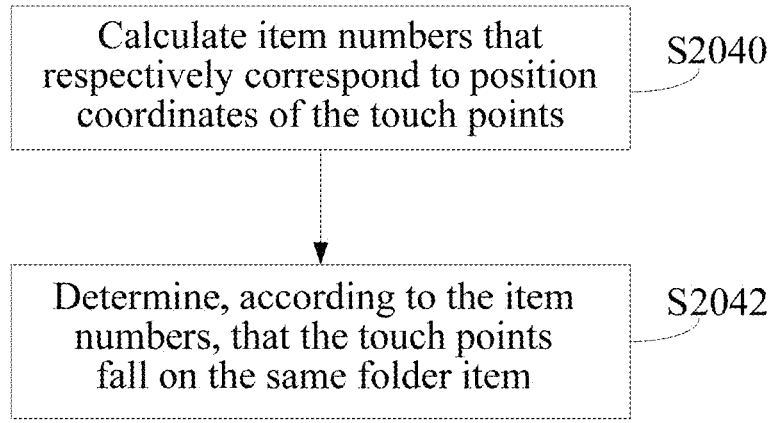
FIG. 3 is a detailed flow chart of step S202 in FIG. 2.

In an embodiment, whether the touch points fall on the same folder item may be determined according to item numbers that correspond to position coordinates of the touch points. Referring to FIG. 3, step S204 may include:

Step S2040: Calculate the item numbers that respectively correspond to the position coordinates of the touch points.

Step S2042: Determine, according to the item numbers, that the touch points fall on the same folder item.

Specifically, an item number is a number of each folder item in a window. When the item numbers corresponding to the position coordinates of the touch points are the same, it is determined that the touch points fall on the same folder item. When the item numbers corresponding to the position coordinates of the touch points are different, it is determined that the touch points do not fall on the same folder item.

Step S206: Calculate, according to the positions of the touch points, the size of a zoomed display area of a folder item where the input event of touch zooming interaction occurs. Step S206 is similar to step S104 in the embodiment illustrated in FIG. 1. For details, reference may be made to the preceding description. No further description is provided here.

Step S208: Acquire a data source that is of the folder item and needs to be displayed, where the data source of the folder item corresponds to the size of the zoomed display area. Step S208 is similar to step S106 in the embodiment illustrated in FIG. 1. For details, reference may be made to the preceding description. No further description is provided here.

Step S210: Display the folder item according to an acquired data source and the size of the zoomed display area. Step S210 is similar to step S108 in the embodiment illustrated in FIG. 1. For details, reference may be made to the preceding description. No further description is provided here.

Step S212: The process ends.

The beneficial effects of this embodiment are as follows:

A method for providing folder item information based on a touch operation is provided, so that when the touch points fall on the same folder item, the size of the zoomed display area of the folder item where the input event of touch zooming interaction occurs may be calculated according to the positions of the touch points on the display screen, and the folder item is displayed according to the size of the display area and the data source corresponding to the size of the display area. In this manner, the level of detail of folder item information in the window may be quickly changed without the need of page switching, thereby improving user experience with simple and quick operation.

An embodiment of the present invention further provides a method for determining, according to the number of touch points or positions of touch points, that objects of a touch operation are all folder items in a window, and changing the levels of detail of information about all folder items in the window.

Figure 4:
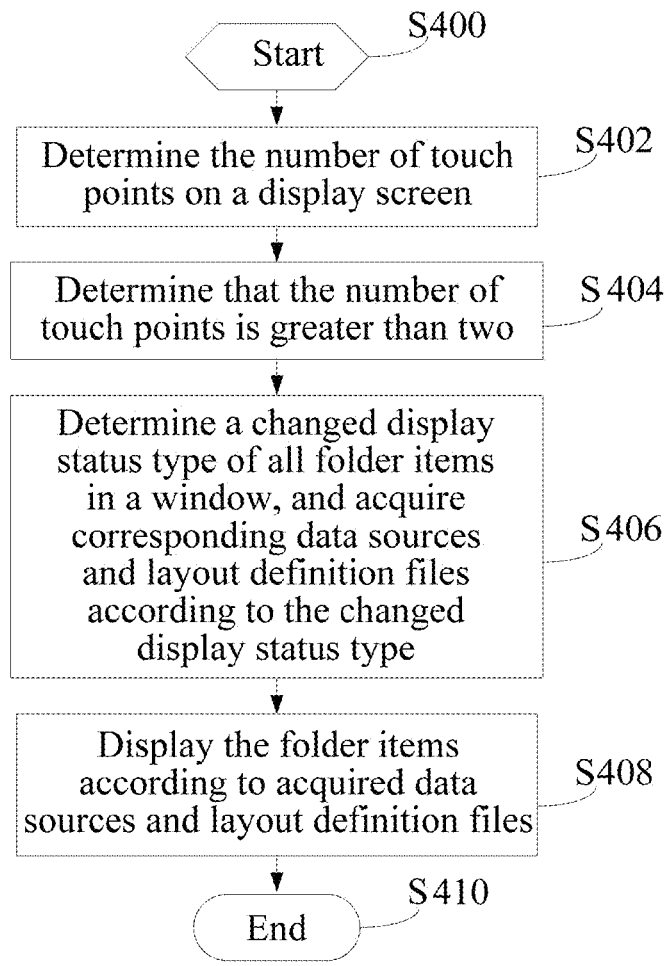
FIG. 4 is a flow chart of a third embodiment of a method for providing folder item information based on a touch operation according to the present invention.

FIG. 4 is a flow chart of a third embodiment of a method for providing folder item information based on a touch operation according to the present invention. The method includes:

Step S400: When an input event of touch zooming interaction occurs on a display screen, the process of this method starts.

Step S402: Determine the number of touch points on the display screen.

Step S404: Determine that the number of touch points is greater two.

Step S406: Determine a changed display status type of all folder items in the window and acquire corresponding data sources and layout definition files according to the changed display status type.

It should be noted that, in this step, according to the area of a polygon formed by position coordinates of the touch points after the input event of touch zooming interaction occurs and the area of a polygon formed by initial position coordinates of the touch points before the input event of touch zooming interaction occurs, a ratio or a difference between the two (namely, the area of the polygon formed by the position coordinates of the touch points after the input event of touch zooming interaction occurs and the area of the polygon formed by the initial position coordinates of the touch points before the input event of touch zooming interaction occurs) may be calculated, to obtain a change direction of the display status type of the folder items after the zooming, that is, whether the display status type is changed to a display status type with more detailed information, or a display status type with more concise information. Specifically, position coordinates of the touch points when the input event of touch zooming interaction occurs may be used as the initial position coordinates of the touch points. The area of a polygon formed by the touch points is calculated according to the initial position coordinates, and is recorded as S0. After the input event of touch zooming interaction occurs, the position coordinates of the touch points are changed. The area of a polygon formed by current touch points is calculated according to the changed position coordinates, and is recorded as S1. Then, a ratio S1/S0 or a difference S1−S0 is calculated. When the ratio S1/S0 is greater than 1 or the difference S1−S0 is greater than 0, the display status type is changed to a display status type with more detailed information, for example, changed from a concise mode to a common mode, or from a common mode to a detail mode, and alternatively, may also be directly changed from a concise mode to a detail mode. When the ratio S1/S0 is smaller than 1 or the difference S1−S0 is smaller than 0, the display status type is changed to a display status type with more concise information, for example, changed from a common mode to a concise mode, or from a detail mode to a common mode, and alternatively, may also be directly changed from a detail mode to a concise mode.

In addition, the changed display status type of all folder items in the window may be determined according to a ratio or a difference between a determined distance between position coordinates of the touch points after the input event of touch zooming interaction occurs and a determined distance between initial position coordinates of the touch points before the input event of touch zooming interaction occurs. For example, a distance between position coordinates of any two touch points after the input event of touch zooming interaction occurs and a distance between initial position coordinates of the two touch points before the input event of touch zooming interaction occurs may be calculated, and a ratio or a difference between the two (the distance between the position coordinates of any two touch points after the input event of touch zooming interaction occurs and the distance between the initial position coordinates of the two touch points before the input event of touch zooming interaction occurs) is calculated, to obtain a change direction of the display status type of the folder items after the zooming, that is, whether the display status type is changed to a display status type with more detailed information, or a display status type with more concise information. When this kind of calculation is performed, any two touch points in the input event of touch zooming interaction may be adopted while other touch points in the input event of touch zooming interaction may be ignored. When a calculated ratio is greater than 1 or a calculated difference is greater than 0, the display status type is changed to a display status type with more detailed information, for example, changed from a concise mode to a common mode, or from a common mode to a detail mode, and alternatively, may also be directly changed from a concise mode to a detail mode, and vice versa. That is, when a calculated ratio is smaller than 1 or a calculated difference is smaller than 0, the display status type is changed to a display status type with more concise information, for example, changed from a common mode to a concise mode, or from a detail mode to a common mode, and alternatively, may also be directly changed from a detail mode to a concise mode.

In an embodiment, the display status types of the folder items may be preset, and a data source and a layout definition file that correspond to a folder item in each of the display status types of the folder items may be set.

In an embodiment, the display status types of the folder items may be any two of the following modes: a common mode, a concise mode, and a detail mode. The preceding three modes correspond to respective data sources and layout definition files. For example, in a scenario in which a folder item is a list control, a data source of the folder item is a data adapter (Adapter), and a layout definition file is an extensible markup language (XML) file that specifies components in a list. In this case, a data source corresponding to the concise mode may be set to Adapter 0, a layout definition file corresponding to the concise mode may be set to XML file 0, a data source corresponding to the common mode may be set to Adapter 1, a layout definition file corresponding to the common mode may be set to XML file 1, a data source corresponding to the detail mode may be set to Adapter 2, and a layout definition file corresponding to the detail mode may be set to XML file 2. In this case, when a display mode of a certain folder item is changed, for example, changed from the common mode to the detail mode, it is set that the data source of the folder item is changed from Adapter 1 to Adapter 2, and the layout definition file of the folder item is changed from XML file 1 to XML file 2.

Step S408: Display the folder items according to the acquired data sources and layout definition files.

Figure 11:
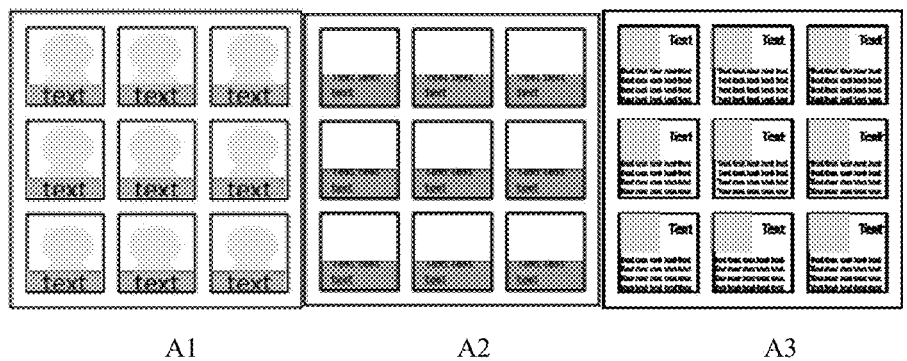
FIG. 11 is a diagram of an effect of changing a display status type of all folder items in a window according to the present invention.

It should be noted that, because a data source corresponding to each of the display status types is different and a layout definition file corresponding to each of the display status types is different, the amount of information displayed in each of the display status types is different and a layout displayed in each of the display status types is different. Therefore, the levels of detail of displayed item information are different in different display status types. FIG. 11 is a diagram of an effect of changing a display status type of all folder items in a window according to the present invention, where A1 is a concise mode, A2 is a common mode, and A3 is a detail mode.

Step S410: The process ends.

It should be noted that in an embodiment, in step S404, when it is determined that the number of touch points is not greater than two and the touch points fall on a same folder item, the subsequent process of this method is the same as step S104 to step S110 in the embodiment illustrated in FIG. 1. For details, reference may be made to the preceding description. No further description is provided here.

The beneficial effects of this embodiment are as follows:

A method for providing folder item information based on a touch operation is provided, so that whether an object of the input event of touch zooming interaction is a single folder item in the window or all folder items in the window may be determined according to the number of the touch points or the positions of the touch points, and the folder item information is displayed according to a result of the determination. That is, when the number of touch points is greater than two, the display status type of all folder items in the window is changed; when the number of touch points is not greater than two and the touch points are located on the same folder item, the size of the zoomed display area of the folder item where the input event of touch zooming interaction occurs is calculated according to the positions of the touch points, and the folder item is displayed according to the size of the display area and the data source corresponding to the size of the display area. In this manner, the levels of detail of all folder items or the level of detail of a single folder item in the window may be quickly changed without the need of page switching, thereby improving user experience with simple and quick operation.

Figure 5:
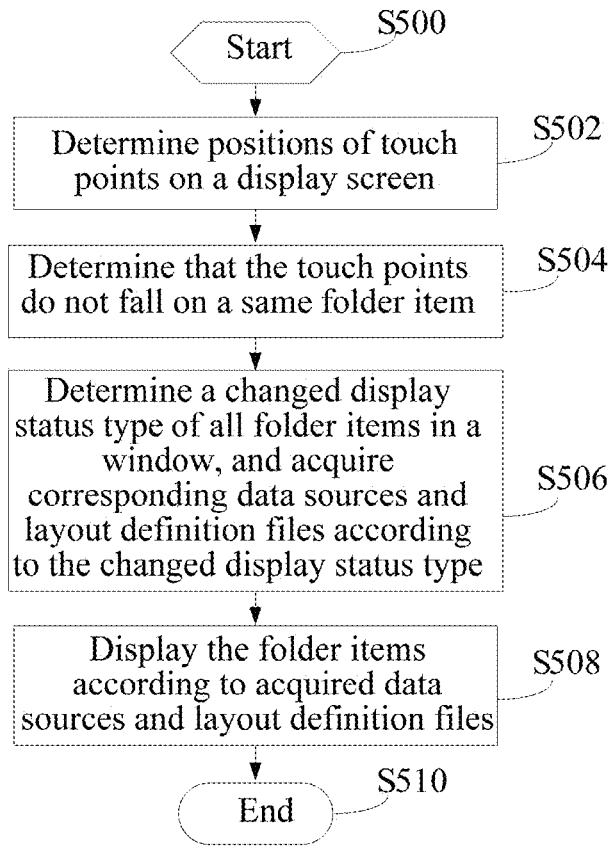
FIG. 5 is a flow chart of a fourth embodiment of a method for providing folder item information based on a touch operation according to the present invention.

FIG. 5 is a flow chart of a third embodiment of a method for providing folder item information based on a touch operation according to the present invention. The method includes:

Step S500: When an input event of touch zooming interaction occurs on a display screen, the process of this method starts.

Step S502: Determine positions of touch points on the display screen.

In an embodiment, the positions of the touch points may be determined according to position coordinates of the touch points on the display screen.

Step S504: Determine that the touch points do not fall on a same folder item.

In an embodiment, whether the touch points fall on the same folder item may be determined according to item numbers that correspond to the position coordinates of the touch points. Step S504 may include: calculating item numbers that respectively correspond to the position coordinates of the touch points; and determining, according to the item numbers, that the touch points do not fall on the same folder item.

Specifically, an item number is a number of each folder item in a window. When the item numbers corresponding to the position coordinates of the touch points are the same, it is determined that the touch points fall on the same folder item. When the item numbers corresponding to the position coordinates of the touch points are different, it is determined that the touch points do not fall on the same folder item.

Step S506: Determine a changed display status type of all folder items in the window, and acquire corresponding data sources and layout definition files according to the changed display status type. Step S506 is similar to step S406 in the embodiment illustrated in FIG. 4. For details, reference may be made to the preceding description. No further description is provided here.

It should be noted that in an embodiment, when the number of touch points is two, according to a determined distance between position coordinates of the touch points after the input event of touch zooming interaction occurs and a determined distance between initial position coordinates of the touch points before the input event of touch zooming interaction occurs, a ratio or a difference between the two (namely, the determined distance between the position coordinates of the touch points after the input event of touch zooming interaction occurs and the determined distance between the initial position coordinates of the touch points before the input event of touch zooming interaction occurs) may be calculated, to obtain a change direction of the display status type after the zooming, that is, whether the display status type is changed to a display status type with more detailed information, or a display status type with more concise information. Specifically, position coordinates of the two touch points when the input event of touch zooming interaction occurs may be used as the initial position coordinates of the two touch points. An initial distance between the two touch points is calculated according to the two initial position coordinates, and is recorded as D0. After the input event of touch zooming interaction occurs, the position coordinates of the two touch points are changed, and a distance between current two touch points is calculated according to the changed position coordinates, and is recorded as D1. Then, a ratio D1/D0 or a difference D1−D0 is calculated. When the ratio D1/D0 is greater than 1 or the difference D1−D0 is greater than 0, the display status type is changed to a display status type with more detailed information, for example, changed from a concise mode to a common mode, or from a common mode to a detail mode, and alternatively, may also be directly changed from a concise mode to a detail mode. When the ratio D1/D0 is smaller than 1 or the difference D1−D0 is smaller than 0, the display status type is changed to a display status type with more concise information, for example, changed from a common mode to a concise mode, or from a detail mode to a common mode, and alternatively, may also be directly changed from a detail mode to a concise mode.

Step S508: Display the folder items according to the acquired data sources and layout definition files. Step S508 is similar to step S408 in the embodiment illustrated in FIG. 4. For details, reference may be made to the preceding description. No further description is provided here.

Step S510: The process ends.

It should be noted that in an embodiment, in step S504, when it is determined that the number of touch points is two and the touch points fall on the same folder item, the subsequent process of this method is the same as step S104 to step S110 in the embodiment illustrated in FIG. 1. For details, reference may be made to the preceding description. No further description is provided here.

The beneficial effects of this embodiment are as follows:

A method for providing folder item information based on a touch operation is provided, so that whether an object of the input event of touch zooming interaction is a single folder item in the window or all folder items in the window is determined according to the positions of the touch points, and the folder item information is displayed according to a result of the determination. That is, when the touch points do not fall on the same folder item, the display status type of all folder items in the window is changed; when the touch points fall on the same folder item, the size of the zoomed display area of the folder item where the input event of touch zooming interaction occurs is calculated according to the positions of the touch points, and the folder item is displayed according to the size of the display area and the data source corresponding to the size of the display area. In this manner, the levels of detail of all folder items or the level of detail of a single folder item in the window may be quickly changed without the need of page switching, thereby improving user experience with simple and quick operation.

An embodiment of the present invention provides an apparatus for changing the level of detail of folder item information in a window through a touch operation.

Figure 6:
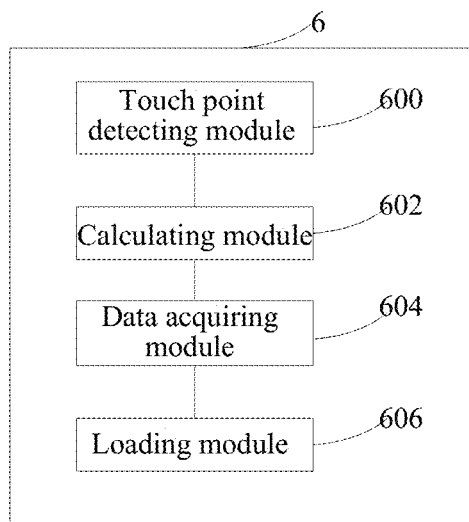
FIG. 6 is a schematic structural diagram of a first embodiment of an apparatus for providing folder item information based on a touch operation according to the present invention.

FIG. 6 is a schematic structural diagram of a first embodiment of an apparatus for providing folder item information based on a touch operation according to the present invention, where an apparatus 6 includes:

A touch point detecting module 600 is configured to determine positions of touch points on a display screen when an input event of touch zooming interaction occurs. In an embodiment, the determining, by the touch point detecting module 600, the positions of the touch points on the display screen is determining coordinates of the touch points.

A calculating module 602 is configured to calculate, according to the positions of the touch points, a size of a zoomed display area of a folder item where the input event of touch zooming interaction occurs.

In an embodiment, according to a determined distance between position coordinates of the touch points after the input event of touch zooming interaction occurs and a determined distance between initial position coordinates of the touch points before the input event of touch zooming interaction occurs, a ratio between the two (the determined distance between the position coordinates of the touch points after the input event of touch zooming interaction occurs and the determined distance between the initial position coordinates of the touch points before the input event of touch zooming interaction occurs), may be calculated, and the size of the display area of the folder item after the input event of touch zooming interaction occurs is calculated according to the ratio.

In an embodiment, position coordinates of two touch points when the input event of touch zooming interaction occurs may be used as the initial position coordinates of the two touch points. An initial distance between the two touch points is calculated according to the two initial position coordinates, and is recorded as D0. After the input event of touch zooming interaction occurs, the position coordinates of the two touch points are changed, and a distance between current two touch points is calculated according to the changed position coordinates, and is recorded as D1. In this case, a zooming ratio of the input event of touch zooming interaction is a ratio of D1 to D0, that is, D1/D0. Specifically, the size of the display area of the folder item after an input operation of zooming interaction is performed should be D1/D0 times the size of a display area of the folder item before the input operation of zooming interaction is performed.

A data acquiring module 604 is configured to acquire a data source that is of the folder item and needs to be displayed, where the data source of the folder item corresponds to the size of the zoomed display area, and the size of the zoomed display area is calculated by the calculating module 602.

It should be noted that, generally, the larger the display area, the greater the amount of information of a data source corresponding to the display area, and the higher the level of detail of displayed folder item information.

A loading module 606 is configured to display the folder item according to the data source acquired by the data acquiring module 604 and the size of the zoomed display area.

FIG. 9 is a schematic diagram of changing the level of detail of information about a single folder item in a window according to the present invention. It should be noted that, when the size of a display area of a folder item in the window is changed, a visual effect that occurs when the size of the display area of the folder item is changed may be selected as required. For example, when the folder item is zoomed in, the folder item may be superposed on other folder items in the window (as shown in FIG. 10), and may also squeeze out other folder items in the window.

Figure 7:
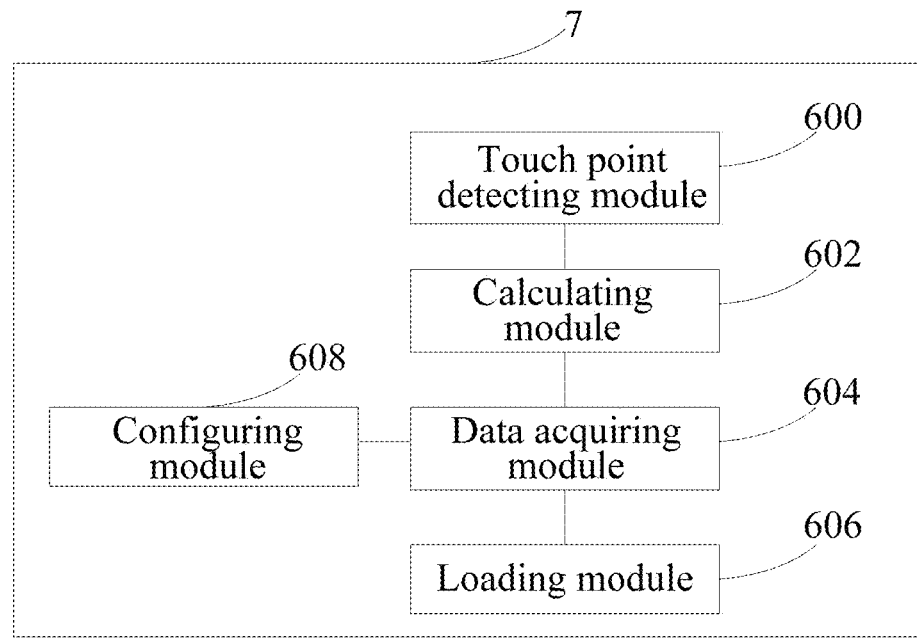
FIG. 7 is a schematic structural diagram of a second embodiment of an apparatus for providing folder item information based on a touch operation according to the present invention.

In an embodiment, as shown in FIG. 7, in a second embodiment of an apparatus for providing folder item information based on a touch operation according to the present invention, a configuring module 608 may be further included and configured to preset correspondence between the size of the display area of the folder item and a data source of data that needs to be displayed. In an embodiment, the configuring module 608 may be configured to preset correspondence between the size of the display area of the folder item and a layout definition file, and correspondence between a data source of data that needs to be displayed and a layout definition file. In this case, the data acquiring module 604 is specifically configured to acquire the data source that is of the folder item and needs to be displayed, and a layout definition file, where the data source of the folder item and the layout definition file correspond to the size of the zoomed display area; and the loading module 606 is configured to display the folder item according to the acquired data source and layout definition file and the size of the zoomed display area.

In an embodiment, in the apparatus shown in FIG. 6 or FIG. 7, the touch point detecting module 600 is further configured to determine that the touch points fall on a same folder item.

In an embodiment, whether the touch points fall on the same folder item may be determined according to item numbers that correspond to the position coordinates of the touch points, and in this case, the touch point detecting module 600 is specifically configured to calculate item numbers that respectively correspond to the position coordinates of the touch points; and determine, according to the item numbers, that the touch points fall on the same folder item.

Specifically, an item number is a number of each folder item in a window. When the item numbers corresponding to the position coordinates of the touch points are the same, it is determined that the touch points fall on the same folder item. When the item numbers corresponding to the position coordinates of the touch points are different, it is determined that the touch points do not fall on the same folder item.

The beneficial effects of this embodiment are as follows:

An apparatus for providing folder item information based on a touch operation is provided, so that the size of the zoomed display area of the folder item where the input event of touch zooming interaction occurs may be calculated according to the positions of the touch points on the display screen, and the folder item is displayed according to the size of the display area and the data source corresponding to the size of the display area. In this manner, the level of detail of folder item information in the window may be quickly changed without the need of page switching, thereby improving user experience with simple and quick operation.

An embodiment of the present invention further provides an apparatus for determining, according to the number of touch points or positions of touch points, whether an object of a touch operation is a single folder item in a window or all folder items in the window, and displaying folder item information according to a result of the determination.

Figure 8:
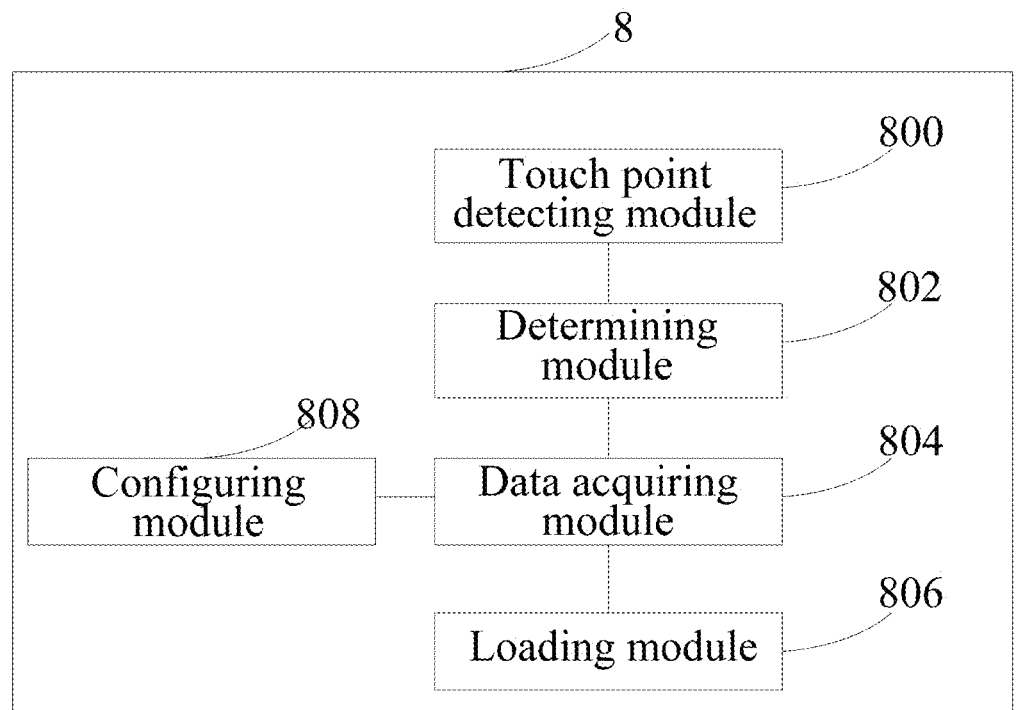
FIG. 8 is a schematic structural diagram of another apparatus for providing folder item information based on a touch operation according to the present invention.

FIG. 8 is a schematic structural diagram of another apparatus for providing folder item information based on a touch operation according to the present invention, where an apparatus 8 includes:

a touch point detecting module 800, configured to determine the number of touch points or positions of touch points on a display screen when an input event of touch zooming interaction occurs; a determining module 802, configured to determine a changed display status type of all folder items in a window when it is determined that the number of touch points is greater than two or the touch points do not fall on a same folder item;

a data acquiring module 804, configured to acquire corresponding data sources and layout definition files according to the changed display status type; and a loading module 806, configured to display the folder items according to the data sources and the layout definition files, where the data sources and the layout definition files are acquired by the data acquiring module.

Further, the apparatus may further include a configuring module, configured to preset display status types of folder items, and set a data source and a layout definition file that correspond to a folder item in each display mode.

In an embodiment, the display status types of the folder items may be any two of the following modes: a common mode, a concise mode, and a detail mode. The preceding three modes correspond to respective data sources and layout definition files. For example, in a scenario in which a folder item is a list control, a data source of the folder item is a data adapter (Adapter), and a layout definition file is an extensible markup language (XML) file about components in a specified list. In this case, a data source corresponding to the concise mode may be set to Adapter 0, a layout definition file corresponding to the concise mode may be set to XML file 0, a data source corresponding to the common mode may be set to Adapter 1, a layout definition file corresponding to the common mode may be set to XML file 1, a data source corresponding to the detail mode may be set to Adapter 2, and a layout definition file corresponding to the detail mode may be set to XML file 2. In this case, when a display mode of a certain folder item is changed, for example, changed from the common mode to the detail mode, it is set that the data source of the folder item is changed from Adapter 1 to Adapter 2, and the layout definition file of the folder item is changed from XML file 1 to XML file 2.

In an embodiment, the determining, by the touch point detecting module 600, the positions of the touch points on the display screen is determining coordinates of the touch points.

In an embodiment, the determining that the touch points do not fall on the same folder item includes: calculating item numbers that respectively correspond to position coordinates of the touch points; and determining, according to the item numbers, that the touch points do not fall on the same folder item. Specifically, an item number is a number of each folder item in a window. When the item numbers corresponding to the position coordinates of the touch points are different, it is determined that the touch points do not fall on the same folder item.

In addition, the determining module 802 is further configured to determine the changed display status type of all folder items in the window according to a ratio or a difference between a determined distance between position coordinates of the touch points after the input event of touch zooming interaction occurs and a determined distance between initial position coordinates of the touch points before the input event of touch zooming interaction occurs.

It should be noted that, when the touch point detecting module 800 determines that the number of touch points is greater than two, the determining module 802 may, according to the area of a polygon formed by position coordinates of the touch points after the input event of touch zooming interaction occurs and the area of a polygon formed by initial position coordinates of the touch points before the input event of touch zooming interaction occurs, calculate a ratio or a difference between the two (the area of the polygon formed by the position coordinates of the touch points after the input event of touch zooming interaction occurs and the area of the polygon formed by the initial position coordinates of the touch points before the input event of touch zooming interaction occurs), to obtain a change direction of the display status type of the folder items after the zooming, that is, whether the display status type is changed to a display status type with more detailed information, or a display status type with more concise information. Specifically, position coordinates of the touch points when the input event of touch zooming interaction occurs may be used as the initial position coordinates of the touch points. The area of a polygon formed by the touch points is calculated according to the initial position coordinates, and is recorded as S0. After the input event of touch zooming interaction occurs, the position coordinates of the touch points are changed. The area of a polygon formed by current touch points is calculated according to the changed position coordinates, and is recorded as S1. Then, a ratio S1/S0 or a difference S1−S0 is calculated. When the ratio S1/S0 is greater than 1 or the difference S1−S0 is greater than 0, the display status type is changed to a display status type with more detailed information, for example, changed from a concise mode to a common mode, or from a common mode to a detail mode, and alternatively, may also be directly changed from a concise mode to a detail mode. When the ratio S1/S0 is smaller than 1 or the difference S1−S0 is smaller than 0, the display status type is changed to a display status type with more concise information, for example, changed from a common mode to a concise mode, or from a detail mode to a common mode, and alternatively, may also be directly changed from a detail mode to a concise mode.

In addition, when the touch point detecting module 800 determines that the number of touch points is greater than two, the determining module 802 may further determine the changed display status type of all folder items in the window according to a ratio or a difference between a determined distance between position coordinates of the touch points after the input event of touch zooming interaction occurs and a determined distance between initial position coordinates of the touch points before the input event of touch zooming interaction occurs. For example, a distance between position coordinates of any two touch points after the input event of touch zooming interaction occurs and a distance between initial position coordinates of the two touch points before the input event of touch zooming interaction occurs may be calculated, and a ratio or a difference between the two (the distance between the position coordinates of any two touch points after the input event of touch zooming interaction occurs and the distance between the initial position coordinates of the two touch points before the input event of touch zooming interaction occurs) is calculated, to obtain a change direction of the display status type of the folder items after the zooming, that is, whether the display status type is changed to a display status type with more detailed information, or a display status type with more concise information. When this kind of calculation is performed, any two touch points in the input event of touch zooming interaction may be adopted while other touch points in the input event of touch zooming interaction may be ignored. When a calculated ratio is greater than 1 or a calculated difference is greater than 0, the display status type is changed to a display status type with more detailed information, for example, changed from a concise mode to a common mode, or from a common mode to a detail mode, and alternatively, may also be directly changed from a concise mode to a detail mode, and vice versa. That is, when a calculated ratio is smaller than 1 or a calculated difference is smaller than 0, the display status type is changed to a display status type with more concise information, for example, changed from a common mode to a concise mode, or from a detail mode to a common mode, and alternatively, may also be directly changed from a detail mode to a concise mode.

It should be noted that, when the touch point detecting module 800 determines that the touch points do not fall on the same folder item, the determining module 802 may, according to a determined distance between position coordinates of the touch points after the input event of touch zooming interaction occurs and a determined distance between initial position coordinates of the touch points before the input event of touch zooming interaction occurs, calculate a ratio or a difference between the two (the distance between the position coordinates of the touch points after the input event of touch zooming interaction occurs and the distance between the initial position coordinates of the touch points before the input event of touch zooming interaction occurs), to obtain a change direction of the display status type after the zooming, that is, whether the display status type is changed to a display status type with more detailed information, or a display status type with more concise information. Specifically, position coordinates of the two touch points when the input event of touch zooming interaction occurs may be used as the initial position coordinates of the two touch points. An initial distance between the two touch points is calculated according to the two initial position coordinates. and is recorded as D0. After the input event of touch zooming interaction occurs, the position coordinates of the two touch points are changed, and a distance between current two touch points is calculated according to the changed position coordinates, and is recorded as D1. Then, a ratio D1/D0 or a difference D1−D0 is calculated. When the ratio D1/D0 is greater than 1 or the difference D1−D0 is greater than 0, the display status type is changed to a display status type with more detailed information, for example, changed from a concise mode to a common mode, or from a common mode to a detail mode, and alternatively, may also be directly changed from a concise mode to a detail mode. When the ratio D1/D0 is smaller than 1 or the difference D1−D0 is smaller than 0, the display status type is changed to a display status type with more concise information, for example, changed from a common mode to a concise mode, or from a detail mode to a common mode, and alternatively, may also be directly changed from a detail mode to a concise mode.

It should be noted that, because a data source corresponding to each of the display status types is different and a layout definition file corresponding to each of the display status types is different, the amount of information displayed in each of the display status types is different and a layout displayed in each of the display status types is different. Therefore, the levels of detail of displayed item information are different in different display status types. FIG. 11 is a diagram of an effect of changing a display status type of all folder items in a window according to the present invention, where A1 is a concise mode, A2 is a common mode, and A3 is a detail mode.

In an embodiment, the apparatus may include all modules in the preceding embodiments, where functions of the touch point detecting module 600 and the touch point detecting module 800 may be implemented by two independent modules, and may also be implemented by one module; functions of the calculating module 602 and the determining module 802 may be implemented by two independent modules, and may also be implemented by one module; functions of the data acquiring module 604 and the data acquiring module 804 may be implemented by two independent modules, and may also be implemented by one module; functions of the loading module 606 and the loading module 806 may be implemented by two independent modules, and may also be implemented by one module; and functions of the configuring module 608 and the configuring module in the embodiment described with reference to FIG. 8 may be implemented by two independent modules, and may also be implemented by one module.

It should be noted that, the methods in the present invention may be implemented by any terminal device supporting a touch operation, for example, mobile phone, personal digital processing terminal (PDA), camera, player, computer, and self-service terminal. Each of the functional modules may run on a processor of any one of the preceding terminal devices.

The beneficial effects of this embodiment are as follows:

An apparatus for providing folder item information based on a touch operation is provided, so that whether an object of the input event of touch zooming interaction is a single folder item in the window or all folder items in the window is determined according to the number of the touch points or the positions of the touch points, and the folder item information is displayed according to a result of the determination. That is, when the number of touch points is greater than two and the touch points do not fall on the same folder item, the display status type of all folder items in the window is changed; when the touch points fall on the same folder item, the size of the zoomed display area of the folder item where the input event of touch zooming interaction occurs is calculated according to the positions of the touch points, and the folder item is displayed according to the size of the display area and the data source corresponding to the size of the display area. In this manner, the levels of detail of all folder items or the level of detail of a single folder item in the window may be quickly changed without the need of page switching, thereby improving user experience with simple and quick operation.

Figure 12A:
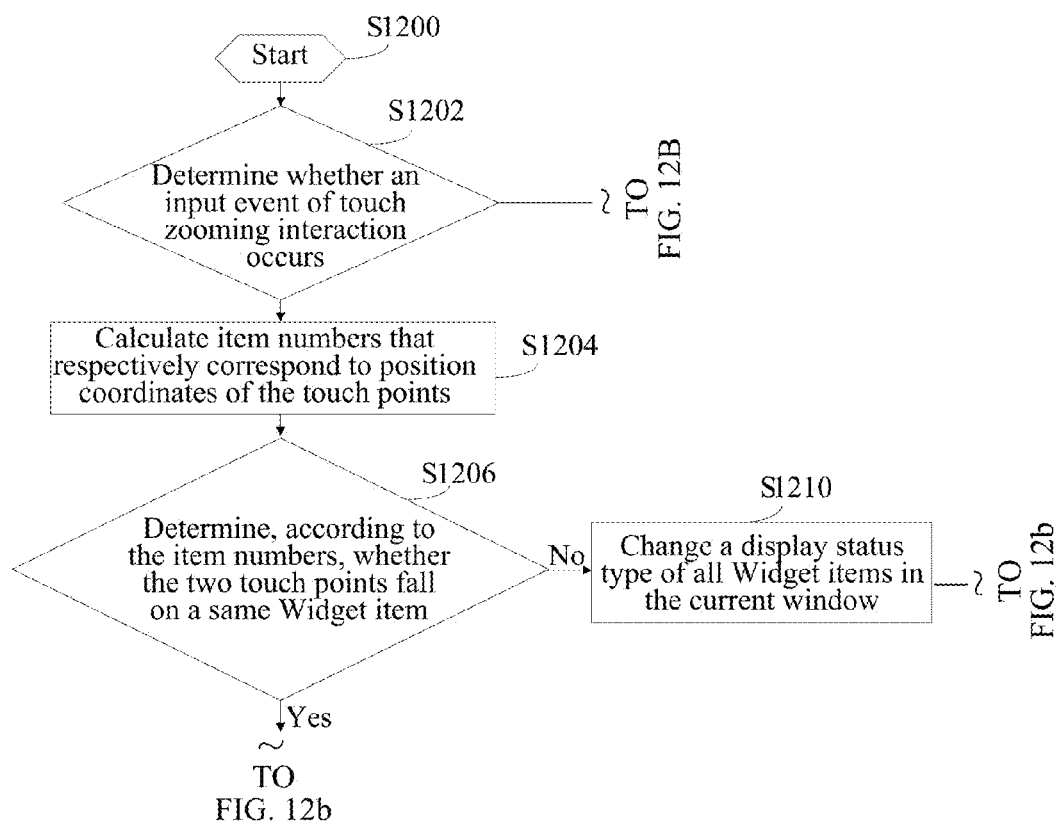
FIGS. 12a and 12b are flow charts of example 1 of performing touch zooming on a Widget item in a Widget window according to the present invention.
Figure 12B:
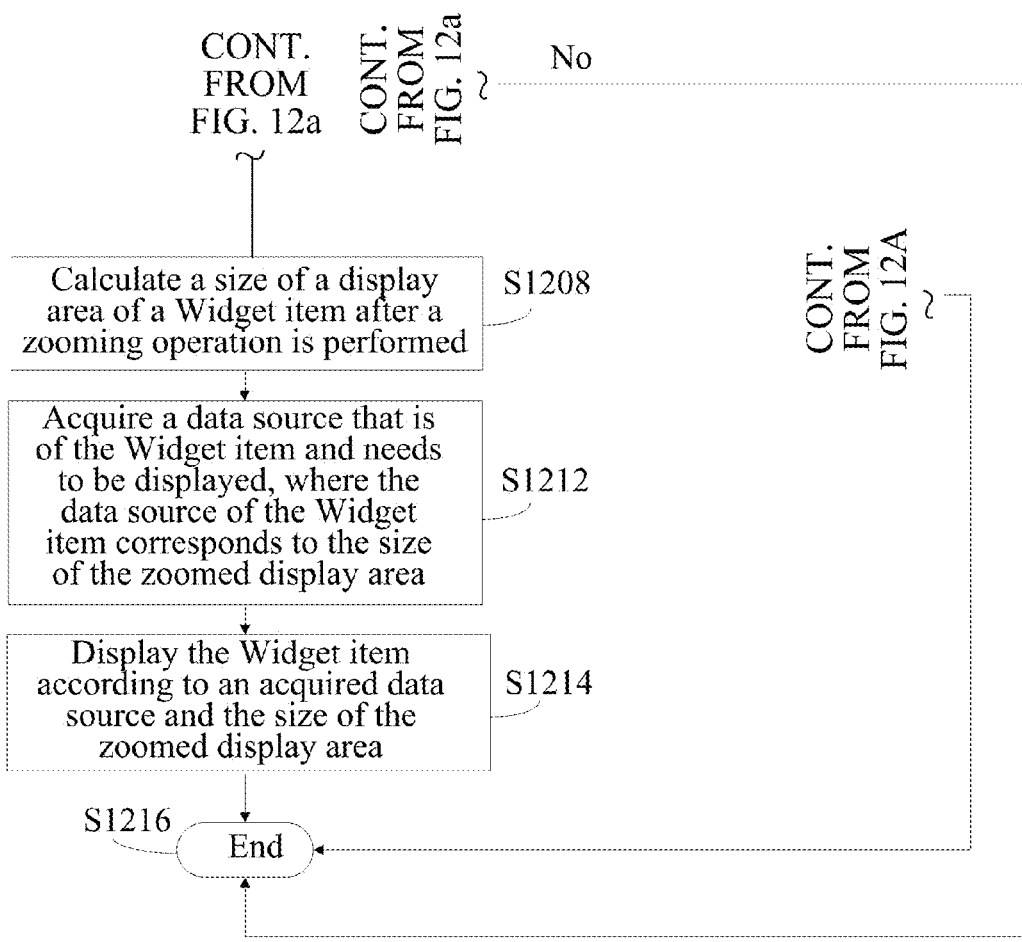

FIGS. 12a and 12b are flow charts of example 1 of performing touch zooming on a Widget item in a Widget window according to the present invention. In example 1, display status types of Widget items are preset, and for example, include a common mode, a concise mode, and a detail mode in example 2, and a data source and a layout definition file that correspond to a Widget item in each display mode are set. A record table is pre-stored for recording a current display mode of each Widget item. The method includes the following steps:

S1200: The process starts.

S1202: Determine whether an input event of touch zooming interaction occurs.

If an input event of touch zooming interaction does not occur, step S1216 is performed to end the process of this method.

If an input event of touch zooming interaction occurs, step S1204 is performed to calculate item numbers that respectively correspond to position coordinates of two touch points.

Step S1206: Determine, according to the item numbers, whether the two touch points fall on a same Widget item.

If the two touch points do not fall on a same Widget item, step S1210 is performed to change a display status type of all Widget items in the window. Specifically, a display mode which is of all Widget items in the Widget window and in the record table is changed to a new display mode, data sources and layout definition files of all Widget items in the window are found according to the new display mode, where the data sources and the layout definition files correspond to the new display mode, and display information is reloaded and rearranged. Then, step S1216 of FIG. 12b is performed to end the process of this method.

If the two touch points fall on a same Widget item, step S1208 of FIG. 12b is performed to calculate the size of a display area of a Widget item after a zooming operation is performed, and according to a distance between position coordinates of the two touch points and a distance between initial position coordinates of the two touch points, calculate a ratio between the two distances to obtain a zooming ratio of the zooming interaction input, thereby obtaining the size of the display area of the Widget item after an input operation of zooming interaction is performed.

Step S1212: Acquire a data source that is of the Widget item and needs to be displayed, where the data source of the Widget item corresponds to the size of the zoomed display area.

Step S1214: Display the Widget item according to an acquired data source and the size of the zoomed display area.

Step S1216: The process of this method ends.

The beneficial effects of this embodiment are as follows: A method for performing touch zooming on a Widget item in a Widget window is provided, so that whether an object of the input event of touch zooming interaction is a single Widget item in the Widget window or all Widget items in the Widget window is determined according to positions of user touch points, and Widget item information is displayed according to a result of the determination. That is, when the two touch points do not fall on the same Widget item, the display status type of all Widget items in the Widget window is changed; when the touch points fall on the same Widget item, the size of the zoomed display area of the folder item where the input event of touch zooming interaction occurs may be calculated according to the positions of the touch points on the display screen, and the folder item is displayed according to the size of the display area and the data source corresponding to the size of the display area. In this embodiment, the level of detail of information about a single Widget item or the levels of detail of information about all Widget items in the Widget window may be quickly changed without the need of page switching, thereby improving user experience with simple and quick operation.

Figure 13A:
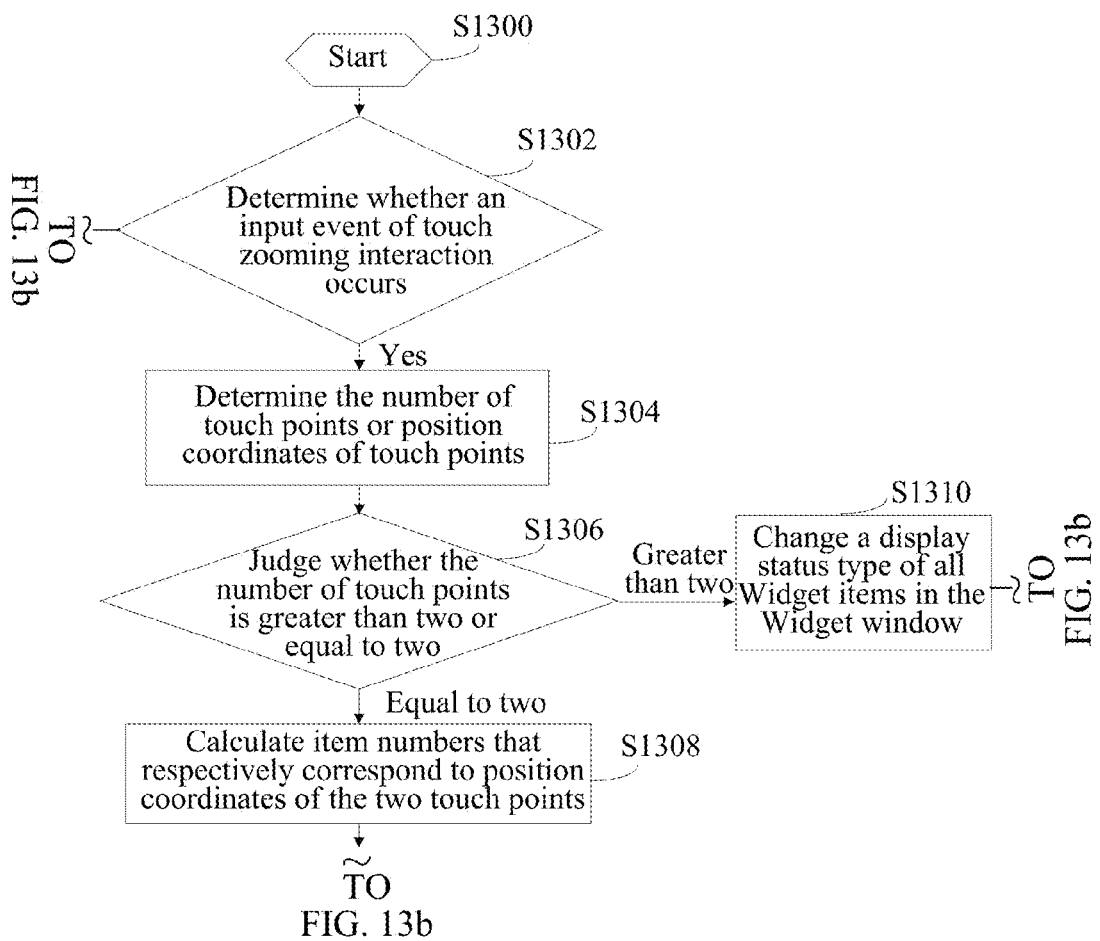
FIGS. 13a and 13b are flow charts of example 2 of performing touch zooming on a Widget item in a Widget window according to the present invention.
Figure 13B:
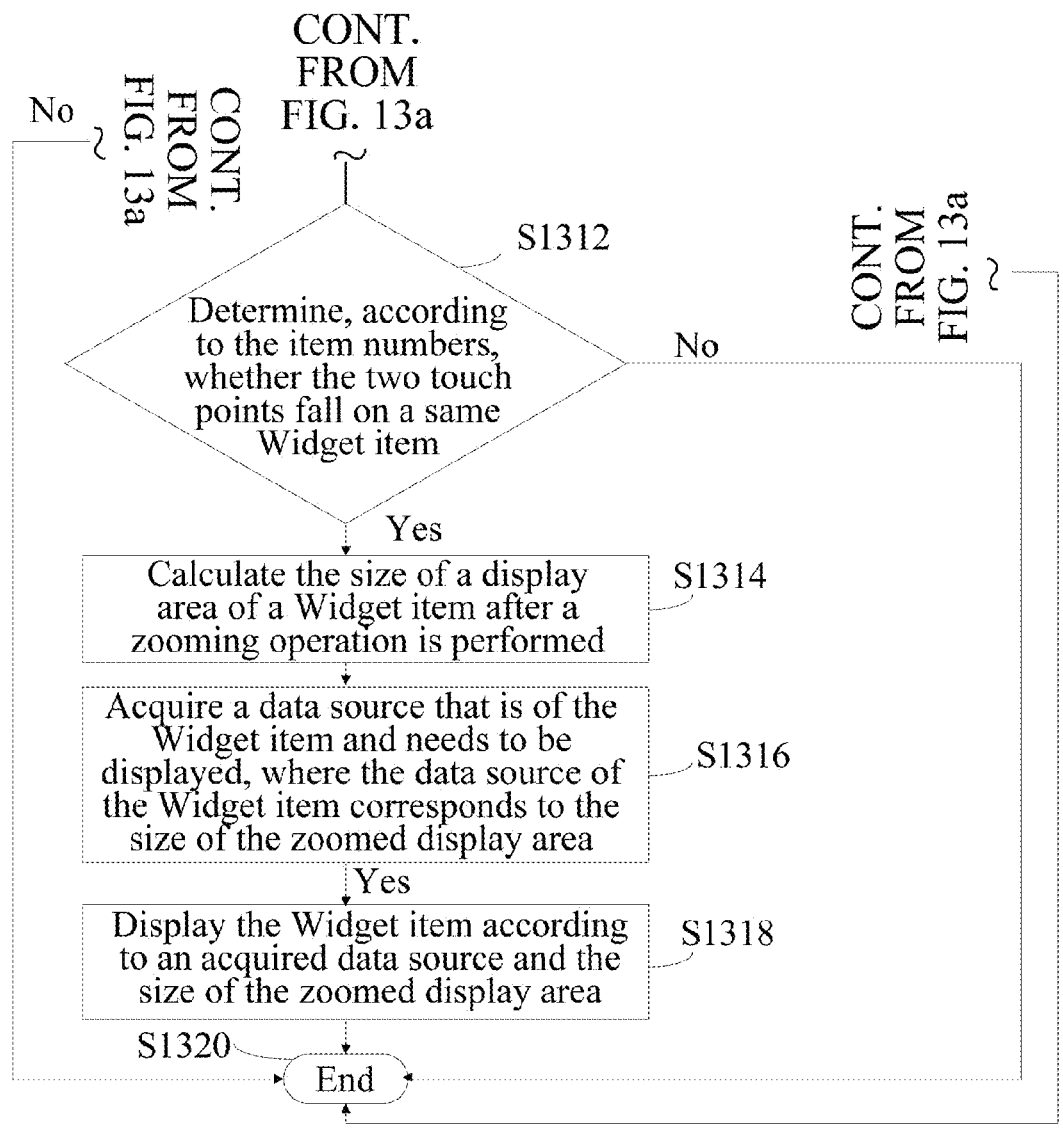

FIGS. 13a and 13b are flow charts of example 2 of performing touch zooming on a Widget item in a Widget window according to the present invention.

In example 2, display status types of Widget items are preset, and for example, include a common mode, a concise mode, and a detail mode in example 3, and a data source and a layout definition file that correspond to a Widget item in each display mode are set. A record table is pre-stored for recording a current display mode of each Widget item. The method includes the following steps:

S1300: The process starts.

S1302: Determine whether an input event of touch zooming interaction occurs.

If an input event of touch zooming interaction does not occur, step S1320 is performed to end the process of this method.

If an input event of touch zooming interaction occurs, step S1304 is performed to determine the number of touch points and position coordinates of touch points.

Step S1306: Determine whether the number of touch points is greater than two or equal to two.

If the number is greater than two, step S1310 is performed to change a display status type of all Widget items in the window. Specifically, a display mode which is of all Widget items in the Widget window and in the record table is changed to a new display mode, data sources and layout definition files of all Widget items in the window are found according to the new display modes, where the data sources and the layout definition files correspond to the new display mode, and display information is reloaded and rearranged. Then, step S1320 of FIG. 13b is performed to end the process.

If the number is equal to two, step S1308 is performed to calculate item numbers that respectively correspond to position coordinates of two touch points.

Step S1312: Determine, according to the item numbers, whether the two touch points fall on a same Widget item.

If the two touch points do not fall on a same Widget item, step S1320 is performed to end the process of this method.

If the two touch points fall on a same Widget item, step S1314 is performed to calculate the size of a display area of a Widget item after a zooming operation is performed, and according to a distance between position coordinates of the two touch points and a distance between initial position coordinates of the two touch points, calculate a ratio between the two distances to obtain a zooming ratio of the zooming interaction input, thereby obtaining the size of the display area of the Widget item after an input operation of zooming interaction is performed.

Step S1316: Acquire a data source that is of the Widget item and needs to be displayed, where the data source of the Widget item corresponds to the size of the zoomed display area.

Step S1320: The process of this method ends.

The beneficial effects of this embodiment are as follows:

A method for performing touch zooming on a Widget item in a Widget window is provided, so that whether an object of the input event of touch zooming interaction is a single Widget item in the Widget window or all Widget items in the Widget window is determined according to the number of user touch points or positions of user touch points, and Widget item information is displayed according to a result of the determination. That is, when the number of touch points is greater than two, the display status type of all Widget items in the Widget window is changed; when the number of touch points is equal to two and the touch points fall on the same Widget item, the size of the zoomed display area of the folder item where the input event of touch zooming interaction occurs may be calculated according to the positions of the touch points on the display screen, and the folder item is displayed according to the size of the display area and the data source corresponding to the size of the display area. In this embodiment, the level of detail of information about a single Widget item or the levels of detail of information about all Widget items in the Widget window may be quickly changed without the need of page switching, thereby improving user experience with simple and quick operation.

Persons of ordinary skill in the art should understand that that all or part of processes in the methods according to the embodiments may be implemented by a computer program instructing relevant hardware. The program may be stored in a computer readable storage medium. When the program is executed, the processes of the methods according to the embodiments may be performed. The storage medium may be a magnetic disk, a compact disk, a read-only memory (Read-Only Memory, ROM), a random access memory (Random Access Memory, RAM), and so on.

The foregoing describes exemplary embodiments of the present invention. It should be specified that persons of ordinary skill in the art may make several improvements and modifications without departing from the principle of the present invention, and these improvements and modifications shall fall within the protection scope of the present invention.

The invention claimed is:

1. A method for providing folder item information based on a touch operation, wherein the method comprises:
   determining first position coordinates of touch points on a display screen when an input event of touch zooming interaction occurs, and second position coordinates of the touch points on the display screen after the input event of touch zooming interaction occurs, wherein the input event of touch zooming interaction includes at least three touch points on the display screen;
   calculating, an area of a first polygon formed by the first position coordinates of the touch points, and an area of a second polygon formed by the second position coordinates of the touch points;
   calculating, a ratio of the area of the first polygon to the area of the second polygon, or a difference between the area of the first polygon and the area of the second polygon;
   determining, according to the ratio of the area of the first polygon to the area of the second polygon or the difference between the area of the first polygon and the area of the second polygon, a changed display status type of folder items in a window;
   acquiring corresponding data sources and layout definition files according to the changed display status type; and
   displaying the folder items according to acquired data sources and the layout definition files.

2. The method according to claim 1, further comprising:
   presetting display status types of folder items and a data source and a layout definition file that correspond to a folder item in a display status type of a folder item.

3. An apparatus for providing folder item information based on a touch operation, comprising:
   a processor configured to determine first position coordinates of touch points on a display screen when an input event of touch zooming interaction occurs, and second position coordinates of the touch points on the display screen after the input event of touch zooming interaction occurs, wherein the input event of touch zooming interaction includes at least three touch points on the display screen;
   wherein the processor is further configured to calculate, an area of a first polygon formed by the first position coordinates of the touch points, and an area of a second polygon formed by the second position coordinates of the touch points;
   wherein the processor is further configured to calculate, a ratio of the area of the first polygon to the area of the second polygon, or a difference between the area of the first polygon and the area of the second polygon;
   wherein the processor is further configured to determine, according to the ratio of the area of the first polygon to the area of the second polygon or the difference between the area of the first polygon and the area of the second polygon, a changed display status type of folder items in a window;
   wherein the processor is further configured to acquire corresponding data sources and layout definition files according to the changed display status type; and
   wherein the processor is further configured to display the folder items according to acquired data sources and the layout definition files.

4. The apparatus according to claim 3, wherein the processor is further configured to preset display status types of folder items, and set a data source and a layout definition file that correspond to a folder item in a display mode.

* * * * *